July 4, 1950 W. MENRATH 2,514,082
VEHICLE DRAFT ELIMINATOR
Filed March 27, 1948
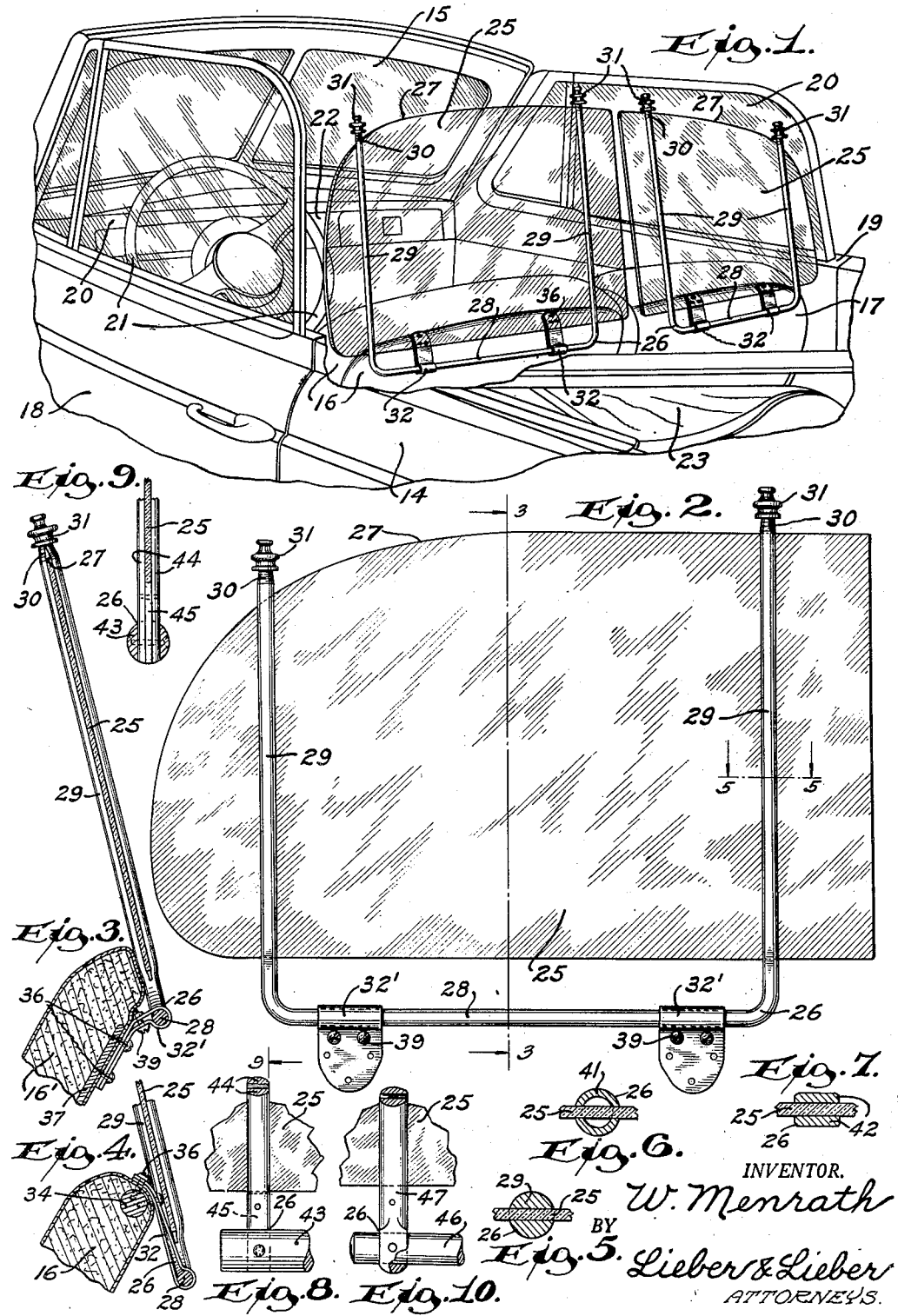
INVENTOR.
W. Menrath
BY
Lieber & Lieber
ATTORNEYS.

Patented July 4, 1950

2,514,082

UNITED STATES PATENT OFFICE 2,514,082

VEHICLE DRAFT ELIMINATOR

Walter Menrath, Milwaukee, Wis.

Application March 27, 1948, Serial No. 17,441

3 Claims. (Cl. 296—85)

This invention relates generally to improvements in apparatus for protecting the occupants of open vehicles against annoying draft, and relates more specifically to improvements in the construction of vehicle draft eliminators of the type revealed in my prior application Serial No. 639,189, filed January 5, 1946, now Patent No. 2,442,821, granted June 8, 1948.

It is a well known fact that one of the greatest objections to the use of convertible automobiles wherein the normal closure top may be removed in order to convert such a vehicle into an open type, is the annoyance to which the occupants of the open car are subjected due to severe drafts entering the seat compartments from the rear, especially when travelling at high speeds. In my prior application I have disclosed devices for successfully eliminating these objectionable drafts, by providing the upper rear portion of each seat with an independent swingably adjustable transparent shield hingedly attached to the adjacent seat and adapted to have its free edge swung toward and away from the upper edge of the upwardly and rearwardly inclined windshield when in use, and to be positioned flatwise against the rear of its carrying seat when not in use. While my prior draft eliminating devices function in a highly satisfactory manner, they are relatively costly to manufacture, and rather difficult to install and to adjust in order to properly cooperate with various makes of machines, but I have discovered that the same successful principle of operation may be incorporated in far more commercial devices which are universally applicable to all standard convertible automobiles.

It is therefore a primary object of my present invention to provide various improvements in vehicle draft eliminators of the kind forming the subject of the prior application above referred to, whereby manufacture, installation, and manipulation of such devices is facilitated.

Another important object of this invention is to provide an improved draft eliminating unit for open topped automobiles or the like, which may be produced of durable materials and at moderate cost, and which is adjustable so as to permit firm and convenient application thereof to various types of automobile seat structures.

A further important object of the invention is to provide an improved draft eliminating device for convertible vehicles, which is exceptionally strong and unobstructive to vision, and which is adapted to be easily shifted from inactive concealed position into active position and adjusted to meet varying conditions of use.

Still another important object of the present invention is to provide an improved draft eliminating accessory for speedy open topped vehicles, which will greatly enhance the comfort of the occupants of such conveyances, while also being readily applicable to such vehicles in a neat and attractive manner.

An additional object of my invention is to provide an improved draft eliminator adapted for firm attachment to the seats of vehicles, and which is shatterproof and easily cleanable, while also being extremely flexible in its adaptations and uses.

Another object of the invention is to provide an improved transparent draft eliminating shield assembly embodying a rigid U-shaped frame and a plastic shield, which is especially adapted for application as a unit to divided automobile seats, and to operate most effectively in conjunction with an upwardly and rearwardly inclined front windshield such as utilized in most modern streamlined cars.

A further object of this invention is to provide an improved draft elimination unit for vehicles, which is simple, compact, and durable in construction, and which may be manufactured and sold at moderate cost while also being adjustable in various ways to cooperate with vehicles and seats of diverse types.

These and other objects and advantages of the present invention will be apparent from the following detailed description.

A clear conception of the specific improvements involved and of several typical embodiments of my present invention, may be had by referring to the drawing accompanying and forming a part of this specification in which like reference characters designate the same or similar parts in the various views.

Fig. 1 is a rear and side perspective view looking into the open front seat compartment of a convertible coupé, and showing one type of my improved draft eliminators applied to the divided front seat, the shields being in active position;

Fig. 2 is an enlarged plane view of one of the individual draft eliminating units, similar to those shown in Fig. 1, but having a different type of supporting hinges applied to the frame thereof;

Fig. 3 is a vertical section taken through the unit of Fig. 2 along the line 3—3, and showing the assemblage attached to a fragment of one style of standard vehicle seat;

Fig. 4 is a fragmentary vertical section similar to that of Fig. 3, but showing the type of hinges revealed in Fig. 1 attached to a fragment of another style of standard vehicle seat;

Fig. 5 is a further enlarged transverse section taken along the line 5—5 of Fig. 2, through one arm of a frame formed of solid cylindrical rod stock;

Fig. 6 is likewise enlarged similar section through an arm of a frame formed of tubular cylindrical stock;

Fig. 7 is still another similarly enlarged section through a frame arm formed of complementary flat shield clamping strips;

Fig. 8 is a fragmentary plan view of one corner of a modified composite frame structure;

Fig. 9 is a part sectional side view of the modified frame structure of Fig. 8 looking in the direction of the arrow 9; and Fig. 10 is a fragmentary plan view of a corner of a further modified composite frame structure.

Although the present improvements have been shown and described herein as being especially adapted for application to units attachable to divided front seats of automobiles, it is not my intention to unnecessarily restrict the scope or utility of the invention by virtue of this limited disclosure; and it is also contemplated that specific descriptive terms employed herein be given the broadest possible interpretation consistent with the disclosure.

Referring particularly to Fig. 1 of the drawing, the typical two-door two-seated convertible automobile shown comprises in general, a wheel supported body 14 having a forward driver's compartment provided with a fixed rearwardly and upwardly inclined front windshield 15 and with a pair of laterally adjacent seats having forwardly tiltable backs 16, 17 respectively; a pair of opposite side doors 18, 19 hingedly attached to the body 14 and each having a vertically adjustable side shield 20 cooperable with the adjacent end of the main windshield 15 to provide a rigid continuous transparent wall extending about the front and sides of the upper portion of the driver's compartment; a steering wheel 21 and the usual instrument panel 22 located within the front or driver's compartment forwardly of the seat backs 16, 17; and a removable closure top 23 adapted to be positioned either above the seating compartments in coaction with the shields 15, 20 to provide an upper enclosure, or to be collapsed and folded upon the rear portion of the body 14 to provide an open topped vehicle, as specifically illustrated. All of this vehicle structure is of standard and well known construction, and the vehicle may also be provided with a rear seating compartment as shown.

In accordance with my present invention, I have provided improved draft eliminating units adapted for swinging or adjustable attachment to the upper portions of the seat backs 16, 17, and which are cooperable with the rear edges of the opposite side shields 20 of the vehicle to complete the transparent wall surrounding the upper portion of the adjacent seating compartment. Each of these improved draft eliminating assemblages preferably comprises a transparent specially shaped shield 25 formed of flexible plastic, cellulose acetate, or some other shatter-resistant sheet material; a rigid unitary frame 26 for reinforcing and swingably supporting the shield 25 so that the upper free edge 27 thereof may be swung toward or away from the upper edge of the fixed rearwardly and upwardly inclined windshield 15 and the rear ends of the side shields 20 when the device is in active position or in use; and one or more friction hinges coacting with cylindrical portions of the frame 26 to hold the shield 25 in various positions of adjustment and in inactive position when not in use.

Referring more specifically to Figs. 1 to 5 inclusive, the improved draft eliminator shown therein has the unitary shield supporting frame 26 thereof formed of a single piece of round metal rod stock bent into U-shape to provide an elongated approximately cylindrical pivot bar 28 and integral opposite side arms 29 projecting away from the bar ends. Each of these side transverse arms 29 is slotted throughout the major portion of its length to form approximately semi-cylindrical laterally spaced bifurcations, and the outer arm ends are provided with screw threads 30 adapted for the reception of clamping nuts 31, see Figs. 1, 2 and 3. The slits or slots in the arms 29 may be produced in any suitable manner as by milling, sawing or otherwise, and the transparent flexible plastic shield 25 preferably has its outer upper corner cut away and is insertible in any desired position within the slits, but may be firmly clamped in proper position by application of the nuts 31 to the bifurcation threads 30. The cylindrical cross-bar is preferably spaced some distance away from the adjacent edge of the shield 25, and is embraced by one or more resilient friction hinges 32 or 32' depending upon the type of seat back 16, 17 or 16' to which the draft eliminating units are to be applied.

The seat backs may be of various types, and as shown in Figs. 1 and 4, the seat backs 16, 17 are of a type each having a rigid metal frame rod 34 at the top, and in such cases the friction hinges 32 are preferably disposed as illustrated and are firmly secured to the rod 34 by sheet-metal screws 36. However, as shown in Figs. 2 and 3, the seat back 16' is of a type having a thin metal backing plate 37, and in that case the friction hinges 32' may be disposed as illustrated and may be firmly secured to the plate 37 by sheet-metal screws 36. In both cases the strap hinges 32, 32' should be formed of resilient wear-resistant metal and should snugly frictionally embrace the cylindrical portions of the frame bar 28, and the loops of these hinges 32, 32' should be disposed considerably below the tops of the adjacent seat backs and may be urged into snug engagement with the bar 28 by means of clamping bolts 39 as depicted in Figs. 2 and 3. These hinges 32, 32' may also be formed of any desired width, and may be positioned at any desired locality along the bar 28 especially when the bolts 39 are released; thus providing adjustability of the frame 26 relative to the hinges, in addition to the adjustability of the shield 25 relative to the frame arms 29 afforded by the bifurcations and the clamping nuts 31.

While the one-piece U-shaped frame 26 shown in Figs. 2 to 5 inclusive is formed of solid rod stock, this unitary frame may also be formed of other kinds of stock, and may even be built up from several sections. As shown in Fig. 6, the shield supporting frame 26 is formed of cylindrical tube stock 41 which produces an exceptionally rigid frame structure; and as depicted in Fig. 7, the frame 26 may formed of two U-shaped strips of flat bar stock 42 firmly united by welding, rivetting or otherwise. In Figs. 8 and 9, the shield supporting frame is formed of a solid cylindrical cross-bar 43 having arms composed of two half round strips 44 separated by spacer plates 45, firmly secured within opposite end openings of the bar; and in Fig. 10, the composite frame is formed of a solid round pivot bar 46 having transverse arms each consisting of a semi-cylindrical strip 47 folded about and firmly secured to an end of the bar 46 as by rivetting or welding. In each of the several modified frame structures, the opposite side arms are bifurcated for the reception of the shields 25, and the swinging ends of these frame arms should be provided with means such as screw threads 30 and clamping nuts 31 for firmly securing the shields within the arm slots.

Since all of the modified types of unitary frames 26 function in like manner, it will suffice to describe the mode of installing and the normal operation of only one type, as for example that shown in Figs. 1 to 5 inclusive. Depending upon the type of seat back 16, 16' to which the draft eliminating unit is to be applied, the proper type of hinges 32, 32' should first be selected and applied to the pivot bar 28 either as shown in Figs. 1 and 4, or as depicted in Figs. 2 and 3, after which these mounting hinges should be firmly attached to the seat back with the aid of fastening screws 36. In Fig. 3 these sheet-metal screws 36 have been driven into drilled holes in the backing plate 37, whereas in Fig. 4 they have likewise been driven into similar holes drilled into the frame bar 34, and in both cases the hinges 32, 32' will pivotally support the frames 26 so that these frames may be swung from inactive position depending from the hinges and disposed directly against the lower rear portions of the seat backs, to active position as shown and wherein the frame arms 29 project upwardly from the adjacent seats. The frame 26 after having been thus temporarily applied, may be shifted to the right or left so as to properly finally position the same relative to the adjacent seat whereupon bolts 39 may be applied to the resilient hinges to produce the desired frictional clamping and holding effect.

The transparent flexible shield 25 may then be inserted within the slots of the frame arms 29, and after this shield has been properly positioned relative to the adjacent seat back and side shield 20, it may be firmly clamped between the bifurcations of the arms 29 by applying the nuts 31 to the screw threads 30, thus completing the installation. It is noteworthy, that during such installation of the improved unit, the frame may be adjusted along the axis of the mounting hinges, while the shield may be independently adjusted laterally and longitudinally of the frame arms 29, thus permitting convenient proper final positioning of the draft eliminating shield 25 relative to the adjacent side shield and to the seat to which the device is applied. After such proper location and installation of the assemblage, the shield 25 may be swung into various angular positions relative to the hinge axis and will be frictionally held in any desired position of adjustment by the resilient strap hinges; but when in normal use, it is preferable to have the frame lean at a definite angle directly against the top of the adjacent seat back remote from and above the hinge axis as illustrated in Figs. 3 and 4, in order to lend additional support to the shield 25 and to most effectively eliminate annoying vortices and back drafts.

From the foregoing detailed description, it will be apparent that my present invention provides an improved vehicle draft eliminator which besides being simple, compact and durable in construction, is highly flexible in its adaptations and may be readily applied to standard automobile seats of various types by merely utilizing friction hinges of various types. The improved device is adapted to effectively eliminate annoying back drafts in open topped vehicles by cooperating with the main upwardly and rearwardly inclined fixed windshield to ward off air streams which tend to enter the driver's compartment from the rear especially when travelling at high speed; and the cut-away corners and angular adjustability of the shields 25 are important since these features provide means for quickly varying the gap between the top edges of the windshield 15 and side shields 20 and the upper edges 27 of the deflector shields 25. The cut-away outer upper corners of the shields 25 positively prevents scooping of air which tends to flow over the top edges of the side shields 20 when elevated, into the driver's compartment; and also provides the necessary clearance for the top raising rails and for tilting of the seat backs. If these shield corners are not cut away as shown, the rails for raising and supporting the top 23 would interfere with raising and lowering of the shields 25 while the top is up, and they might likewise interfere with tilting of the seat backs when the shields 25 are elevated; and the rounding of the corners also permits the outer edges of the shields 25 to be disposed closely adjacent to the rear ends of the side shields 20.

The unitary U-shaped formation of the frames 26 while enabling adjustment of the transparent shield 25 for accurate final disposition thereof, also stiffens and protects these flexible shields against possible breakage while still permitting them to deflect slightly under pressure; and the disposition of the mounting hinges remote from the adjacent edges of the shields 25 enables the height of these shields to be reduced to a minimum while still avoiding open gaps when the units are in actual use, thus saving transparent material. The location of the pivotal axes of the hinges considerably below the adjacent seat tops, also determines the most efficient angle to which the shields 25 may be tilted forwardly while still permitting these shields to be tilted rearwardly, and also prevents the shields 25 from being blown forwardly to an extent sufficient to strike the seat occupants.

The improved strap hinges 32, 32' may be of any desired width and shape and may also be readily applied to seat backs 16, 16', 17 of various types used by automobile manufacturers as standard equipment; and by dropping the hinge axis below the top of the adjacent seat back, the supporting frame 26 may also be caused to lean firmly against the seat back as shown, for additional support. When not in use, the shields 25 may be swung into snug coaction with the rear surfaces of their supporting seat backs thus avoiding obstruction within the rear seating compartments, and the improved unitary shield supporting frames 26 may be formed of various kinds of stock and either of one or more pieces of material rigidly united to produce strong structures. Each of the strap hinges 32, 32' is preferably formed of a single piece of spring metal bent to form a frame bar receiving loop and to be readily spread for application to the pivot bar of the frame 26, and the deflector units may be manufactured at moderate cost and present a neat and highly finished stream-lined appearance when properly applied. The improved draft eliminators may also be produced in various sizes to fit diverse types of existing vehicles, and have prov-

I claim:

1. A vehicle draft eliminator comprising, a unitary U-shaped frame having an elongated approximately cylindrical pivot bar and rigid integral transverse bifurcated arms projecting away from the opposite end portions of said bar, a transparent shield projecting through the bifurcations of said arms, means coacting with the free ends of said arms for clamping said shield within said bifurcations, and one or more mounting hinges clamped about said bar, said shield being adjustable both laterally and longitudinally of said arms and said bar being axially adjustable relative to said hinges.

2. A vehicle draft eliminator comprising, a U-shaped frame having an elongated pivot bar and integral bifurcated arms projecting away from the opposite end portions of said bar and provided with screw threaded outer free ends, a shield projecting through the arm bifurcations between said threaded ends and said bar, means coacting with said threaded arm ends beyond said shield for frictionally clamping the latter within said bifurcations, and means for swingably supporting said bar.

3. A vehicle draft eliminator comprising, a U-shaped frame having an elongated pivot bar and integral bifurcated arms projecting away from the opposite end portions of said bar and provided with screw threaded outer free ends, a shield projecting through the arm bifurcations between said threaded ends and said bar, means coacting with said threaded arm ends beyond said shield for frictionally clamping the latter within said bifurcations, and hinges for swingably supporting said bar, said bar being axially adjustable relative to said hinges and said shield being adjustable both laterally and longitudinally relative to said arms.

WALTER MENRATH.

REFERENCES CITED

The following references are of record in the file of this patent:

UNITED STATES PATENTS

| Number | Name | Date |
|---|---|---|
| 1,522,476 | Albright | Jan. 13, 1925 |
| 1,689,035 | Hodny | Oct. 23, 1928 |
| 2,442,821 | Menrath | June 8, 1948 |

FOREIGN PATENTS

| Number | Country | Date |
|---|---|---|
| 30,401 | Great Britain | Aug. 10, 1911 |
| 263,604 | Great Britain | Jan. 6, 1927 |
| 606,755 | France | June 19, 1926 |